3,352,209
SERVOMOTOR
Maxwell Leslie Cripe, South Bend, Ind., assignor to The Bendix Corporation, South Bend, Ind., a corporation of Indiana
Filed June 17, 1965, Ser. No. 464,735
12 Claims. (Cl. 91—391)

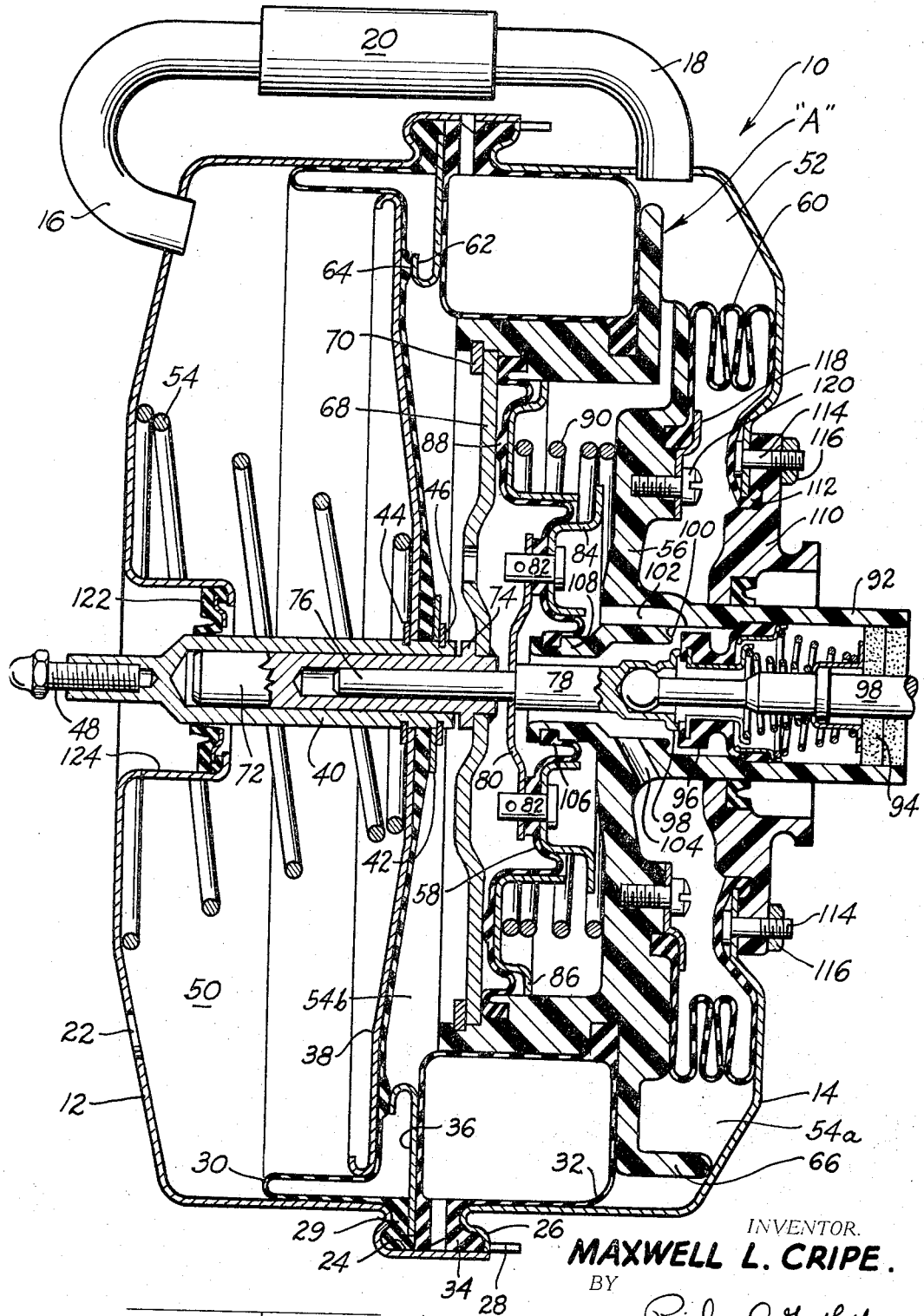

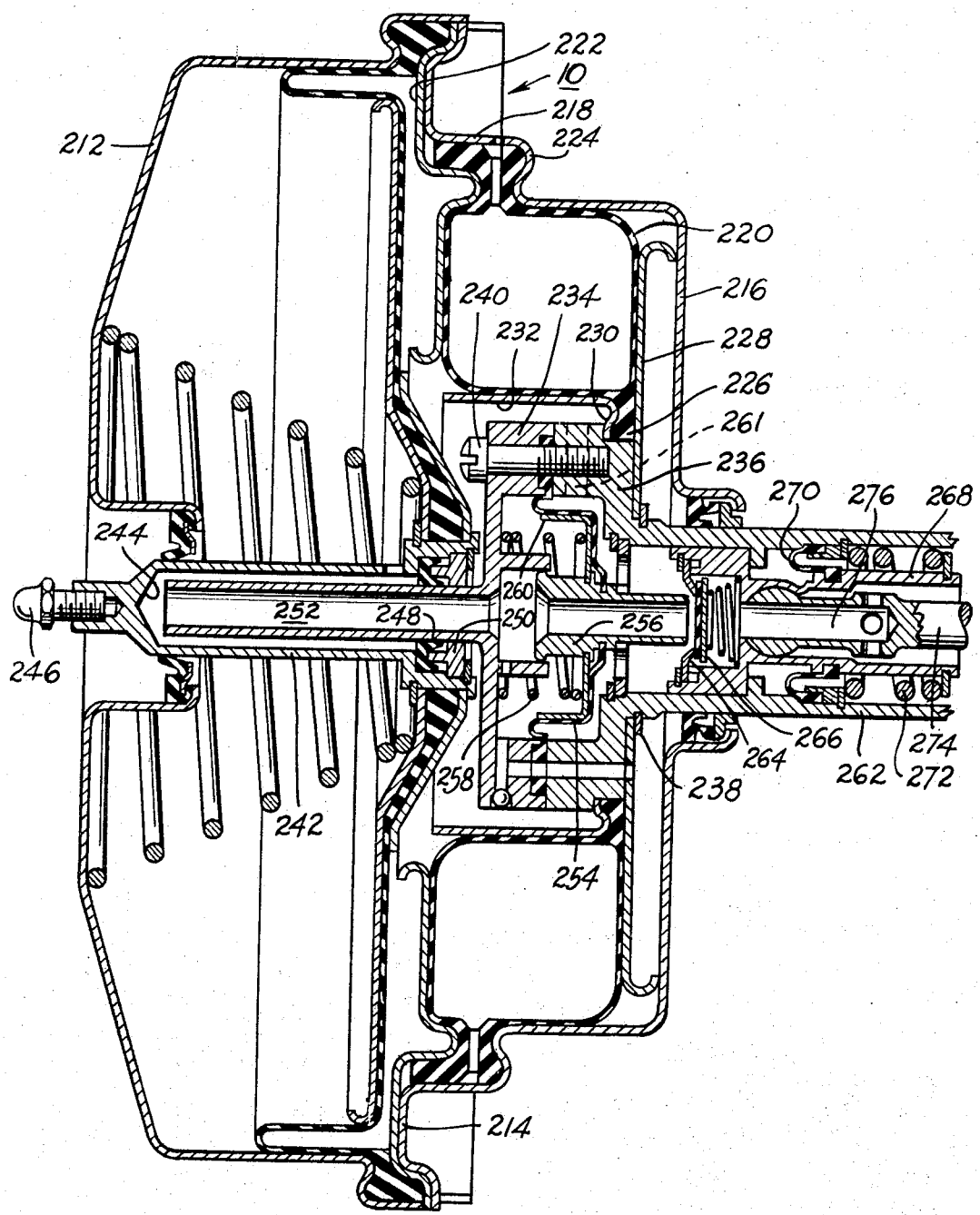

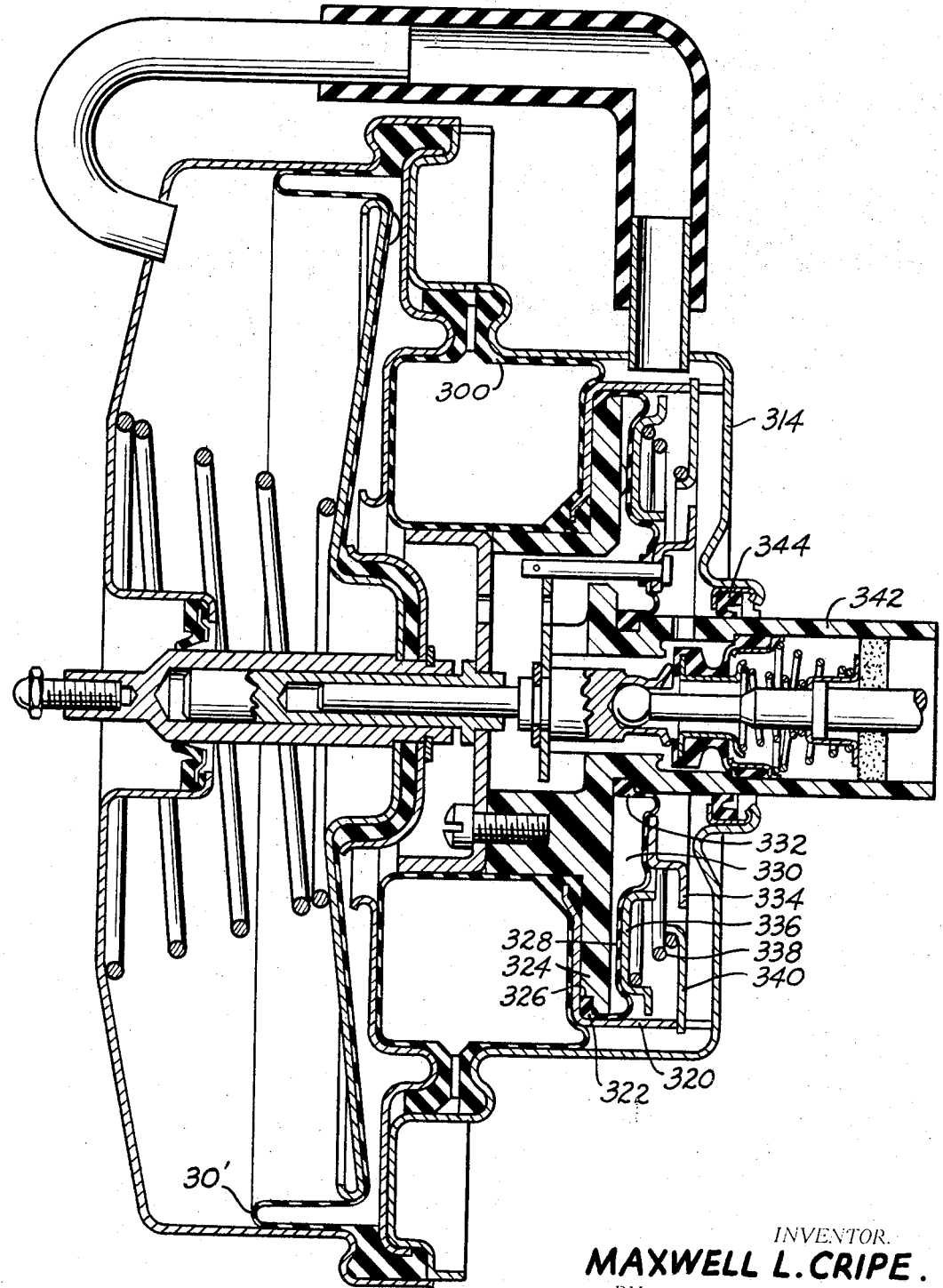

ABSTRACT OF THE DISCLOSURE

A fluid pressure servomotor having a means to limit travel for operation of the movable wall of the servomotor to that required to open the valve until the maximum power is available by the servomotor which thereafter permits manual movement of the valve control means to be additive to the force developed by the power wall for applying additional pressure from the servomotor including a hollow movable wall within the servomotor in addition to the movable wall of the servomotor that is operatively connected to the valve control means to which the movable wall of the servomotor is also operatively connected to be relatively movable therefrom.

---

The present invention relates to fluid pressure servomotors; and more particularly to vacuum actuated fluid pressure servomotors.

An object of the present invention is the provision of a new and improved fluid pressure servo motor for power brakes and the like whose control valve does not provide a follow-up action of its driven elements when power is available to actuate the fluid pressure servomotor, and which actuates the driven elements manually during power failure.

A more particular object of the invention is the provision of a new and improved fluid pressure servomotor having a means to operatively connect a control valve with a movable wall therewithin in such a fashion as to prevent translatory movement of the control valve in accordance with the position of the movable wall until a predetermined actuating pressure has been reached within the servomotor.

A further object of this invention is to provide a valve hold-back means that is functional so long as control pressure and a fluid pressure in the hold-back means are different so that valve follow-up may be permitted when the control pressure and the hold-back pressure are equal as would occur in our design during run-out condition of the servomotor therewith associated.

It is a still further object of this invention to provide a new and improved fluid pressure servomotor having two axially aligned chambers which are separated by means of a pressure responsive means with a hold-back means for a valve structure controlling the pressure responsive means, which hold-back means is located in one of the chambers of the servomotor and is of such an area as to permit travel of the valve mechanism upon the approach of run-out of the servomotor.

The invention resides in certain constructions and combinations and arrangements of parts; and further objects and advantages of the invention will become apparent to those skilled in the art to which the invention relates from the following description of the accompanying drawings in which:

FIGURE 1 is a cross sectional view of one embodiment of the features of my invention;

FIGURE 2 is a cross sectional view of a second embodiment of the features of my invention; and FIGURE 3 is a cross sectional view of a third embodiment of the features of my invention.

With particular reference to FIGURE 1, I show a servomotor 10 having a housing comprised of a forward shell portion 12 and a rearward shell portion 14. As can be readily observed, I have provided a conduit including tubular portions 16 and 18 and connector 20 for cobmunicating fluid to each of the portions 12 and 14 of the housing. In addition the shell portion 12 is provided with an opening 22 which may be fitted with a check valve (not shown) and connected to a power source; i.e. the manifold of an automobile engine by an appropriate conduit.

The shell portions 12 and 14 are joined by a twist locking arrangement that includes an inwardly facing shoulder 24 in the shell portion 12 which is inwardly spaced from an open end of the shell portion 12. The shell portion 14 is provided with a radial flange 26 whose diameter is substantially equal to the inner diameter of the opening in shell portion 12. A more specific description of the method of assembling the shell portions 12 and 14 can be observed from a reading of Patent No. 3,158,930 assigned to the common assignee which issued Dec. 1, 1964. However, it may be generally explained here that the radial flanges 26 are appropriately grooved to pass by inwardly upset portions 28 adjacent the open end of shell portion 12 and thereafter be twisted to such a position that the inwardly upset portions 28 bear upon the portions of the flange 26 between the grooves to hold the shell portions together. I would prefer that some resilient means be employed between the shoulder 24 and the radial flange 26 to insure the bearing of the flange 26 against portions 28, and this is normally provided by a beaded portion 29 of a diaphragm 30 separating the housing formed by assembling the portions 12 and 14 into two variable volume chambers.

However, in this embodiment the diaphragm is not only provided with the bead 29 but a donut diaphragm 32 is also provided with a radial bead 34 and an annular ring 36 is placed between the beads 29 and 34 all of which is compressed between the shoulder 24 and the radial flange 26. As can be seen, the diaphragm 30 extends inwardly over a stiffener plate 38 to snugly fit over a tubular member 40. The diaphragm 30 is held to the tubular member 40 by means of compression between the stiffener plate 38 and a washer 42 that are located on the tube 40 by retaining rings 44 and 46 ahead of and behind these members. The tubular member 40 is provided at its forwardmost end with a threaded opening receiving an adjustable extension 48 which is to be operatively connected with a pressure transmitting means (not shown).

Thus, it is seen that the diaphragm 30 divides the assembled shell portions 12 and 14 into a front variable volume chamber 50 and a rear variable volume chamber 52. Also I have provided a variable rate return spring 54 operatively connected to the shell portion 12 and the stiffener plate 38 to maintain the diaphragm 30 in its rearmost position in the absence of any pressure differential thereacross.

In the variable volume chamber 52 behind the diaphragm 30 I have provided a movable wall A comprising the donut diaphragm 32, a plastic body 56, a reaction diaphragm 58 and an accordian type diaphragm 60. As can be seen the annular plate 36 is provided with a return portion 62 that cooperates with projections 64 on the diaphragm 29 to space the movable wall A from the diaphragm 30 to permit the variable rate spring 54 to position the movable wall A so that a finger 66 formed on the plastic body 56 is in abutment with the shell portion 14 within the housnig 10. Thus the movable wall A partitions the variable volume chamber into variable volume chambers $54_a$ and $54_b$. The movable wall A is supported by means of an annular plate 68 which also is arranged to sealingly connect diaphragm 58 to the movable wall A and hold it in place by means of a retaining ring 70 about the peripheral edges of plate 68. This plate is affixed to a rod 72, as by welding, against a flange 74 thereof. There is relative movement between the rod 72 and the tube 40 whereby the rod 72 may move away from the plate 68 so long as movable wall A is immobile.

As seen the rod 72 is appropriately drilled to receive a projection 76 of a push rod connector 78. In fact the drilling of rod 72 is such as to leave a space between the end of projection 76 and the end of the drilling to accommodate reciprocation of projection 76 within rod 72. As seen the projection 76 is a stepped down portion of the push rod connector 78 and adjacent a shoulder on the push rod connector 78 a plate 80 is mounted which radially extends to connect with at least a pair of threadless fasteners 82 that join the diaphragm 58 to the plate 80 and an annular channel 84 forming a part of a two-part backing plate comprising another annular channel 86. As seen, the diaphragm 58 is provided with appropriately enlarged or bulbous portions 88 that are caused to bear against the plate 68 by a counter reaction spring 90 which serves to hold the two-part backing plate and more particularly the annular channel 86 thereof separated from the annular channel 84 for purposes to be explained hereinafter. The wall 56 is provided with a rearwardly extending tubular projection 92 which forms a fluid inlet to filter means 94 for a fluid pressure source. In addition the tubular projection 92 houses a valve poppet construction that is more particularly described in my Patent 3,106,873 assigned to a common assignee. As seen, a movable poppet 96 is manually actuated by a push rod 98 connected to the push rod connector 78 by ball and socket type connection centrally of the valve poppet 96. The push rod connector 78 is provided with a valve seat, that is, in the released position shown, in contact with the valve poppet 96. A tubular projection 92, on the other hand, is provided with a valve seat 100 as well as passages 102 and 104 which will be more particularly functionally oriented below. It should also be noted that I have attached an inner beaded portion 106 of diaphragm 58 to a forward projection 108 of wall 56. If desired a clamp could be fitted around projection 108 and bead 106, but practice has shown that the simple use of interference fit would provide a sufficiently fixed and sealed connection of these parts.

Shell 14 is provided with a seal plate 110 which closes the opening about projection 92 and seals one of the annular beads of diaphragm 60 to shell 14 as at 112. This plate is held in place by bolts 114 welded to shell 14 and nuts 116. As for the other annular bead of diaphragm 60, it is affixed by retainer plate 118 and screws 120 holding same to wall 56.

Shell 12 is sealed about tube 40 by means of a seal 122 press fitted to a recessed portion 124 of shell 12.

With regard to the construction of FIGURE 2, I have provided essentially the same construction as seen in FIGURE 1, however, the servomotor 10 is now constructed from portions 212 and 214 with portion 212 being for all intents and purposes identical to portion 12 of FIGURE 1. As for shell portion 214 it has been changed from that of FIGURE 1 by providing a reduced volume aftersection 216.

In order to save time to the reader suffice it to say that the diaphragm variable rate return spring and movable wall within shell portion 212 are identical to that in section 12 of FIGURE 1, further explanation of their means of construction is deemed unnecessary. Also I would like to point out that the method of joining shell portions 212 and 214 is preferably the same as that joining sections 12 and 14 of FIGURE 1 and also will not be further described.

In short, the improvement of FIGURE 2 over FIGURE 1 rests in the means for reducing the volume in shell portion 214 which entails forming a reduced volume aftersection 216 in stages from a plate structure, as may be familiar to those skilled in the art to which my invention relates. More particularly shell portion 214 is formed in a hat shaped section having a peripheral portion 218 of a larger diameter than the inner portion 216. The peripheral portion serves to mount a donut diaphragm 220 between a plate 222 extending inwardly from the juncture of shell portions 212 and 214 and a flange 224 of the radial portion 218.

The donut diaphragm 220 is provided with an inner projecting beaded portion 226 which is held to a backing plate 228 by means of a diaphragm retaining means 230 that is provided with an axially extending section 232 resting within the central opening of the donut diaphragm 220. The backing plate 228 is held to a simplified valve housing comprising a forward portion 234 and a rearward portion 236, and more particularly, to the rearward portion 236 by means of a retainer ring 238. Thus the bead 226 is compressed between the retainer 230 and the backing plate 228.

The two portions of the valve housing 234 and 236 are held together by means of appropriately located bolts 240 about the periphery of same.

As for the diaphragm being held to the shell portion 212, it is located internally upon a force transmitting tube 242 that is closed as at 244 and forwardly thereof provided with an adjustable force transmitting member 246. The means of holding the diaphragm is essentially the same as that presented in FIGURE 1, namely the use of a backing plate and a collar between a shoulder and a retaining ring structure. A striking difference between the tubular means 242 and the similar part of FIGURE 1 is in the use of a seal 248 and seal retainer means 250 which cooperate with a tubular projection 252 from the forward portion of the valve housing. It will thus be seen that we have provided for internal fluid passage which has eliminated the need of the external conduits 16 and 18 and connector 20 utilized in the structure of FIGURE 1 by the construction aforementioned.

Internally of the valve housing I have provided a diaphragm 254 that is held at its periphery along the junction line between the portions 234 and 236 and internally on a floating valve seat 256. I have provided a spring 258 between the valve housing portion 234 and a spring bearing plate 260 abutting on the diaphragm 254 to position the floating valve seat 256 rearwardly. As seen the rearward portion 236 is provided with a radial passage 261 (in phantom) to communicate control pressure to the control chamber while providing a reference pressure to one side of diaphragm 254.

The rearward valve housing portion 236 is provided with a rearwardly projecting tubular structure 262 which is provided, forwardly thereof, with a valve seat 264 and a spring biased valve poppet 266 in a reciprocatorily mounted member 268 that is operatively connected to the rearward projection 262 by means of a rolling type diaphragm 270, and a heavy return spring 272 between the member 268 and the projection 262. The spring also maintains the spring biased poppet 266 spaced from the floating valve seat 256. The member 268 is provided with a ball and socket type connection for a push rod 274 that is appropriately drilled to provide radial passage 276 for communicating a fluid pressure source immediately behind the spring biased poppet 266.

With regard to my servomotor construction shown in FIGURE 3, I have provided a unit which combines features of FIGURES 1 and 2 into a simplified structure. More particularly, I have utilized the shell construction of FIGURE 2 essentially with the external fluid conduits of FIGURE 1 and have additionally simplified the valve construction and reaction mechanism as follows:

As seen, I have provided a donut diaphragm 300 which is held to my rear shell 214 and to an embedded diaphragm retainer plate 320 which is also sized to have an internal axial wall which compresses a reaction diaphragm bead 322 to a wall 324 in a groove 326 provided between the wall and a radial surface of the retainer 320. It should be noted at this juncture that all similar elements in FIGURE 3 with regard to FIGURES 1 and 2 have been given prime numbers. The beaded portion 322 of reaction diaphragm 328 also serves to seal a reaction chamber 330 along with an internal beaded portion 332. The reaction diaphragm backing plate is similar to that of FIGURE 1, constructed of two channel portions 334 and 336 of annular construction, and a variable rate counter reaction spring 338 is provided between a depending plate 340 and the channel portion 336 to hold off a section of the reaction diaphragm during the initial operation to open the valving and create a pressure differential across the servomotor diaphragm 30'.

It should also be noted that we have managed to economize on the sealing with regard to shell portion 314 and tubular projection 342 of the wall 324 that extends rearwardly through the shell 314. In other words, we have provided a simple press fitted seal 344.

In operation, each of the three units depicted are quite similar. However, it should be noted that during the normal nonactuated condition shown each of the three units are suspended by an internal pressure that is in each of the various chambers of the servomotor. Also it should be noted that the pressure being introduced internally of the donut diaphragms 32, 220 and 300 in each of the units is different in the suspension pressure to maintain an expanded condition for the donut diaphragms.

Whenever the valve structure is actuated by the push rods of the various units, pressure in the forward shells ahead of the diaphragms 30 and 30' is trapped and a pressure (control pressure) different from that trapped therein is introduced behind diaphragms 30 and 30' to project the force transmitting rods forwardly of the servomotors. The control pressure being introduced behind diaphragms 30 and 30' is at first less than the internal pressure (reference pressure) of the donut diaphragms 32, 220 and 300. This control pressure rises until the servomotors have approached their maximum travel condition whereupon control pressure and the reference pressure is substantially equal. The donut diaphragms 32, 220 and 300 are now collapsible to permit manual follow-through of the push rod to activate the force transmitting means whenever the force on the push rod 98 is sufficient to overcome the effect of vacuum in chamber 54a. This would also happen immediately when power source failure is experienced in that vacuum would no longer be supplied to chambers 50 and 54a.

As for the construction of FIGURE 1, the accordian type diaphragm 60 limits the volume of chamber 54a and thereby serves to proportion (equate) the effective area of the donut diaphragm to that of the reaction diaphragm 88 in order that the manual follow-through action may be accomplished at the "run-out" condition of the servomotor. In other words, the residual vacuum in chamber 54a at power run-out is only sufficient to provide a reference point above which an increase in manual effort may be utilized in increasing the power output of the servomotor 10. The operator will perhaps experience a time and travel delay but the input-to-output force relationship will continue as a linear relationship. This time and travel delay is caused by the movement of the manually movable members to pick up the movable walls.

In the construction of FIGURE 2, the same general idea is carried through by rendering the rear shell of a lesser volume and by substantially reducing the effective area of the reaction diaphragm.

However, a more effectual compromise has been accomplished by the construction of FIGURE 3 wherein the donut diaphragm and the reaction diaphragm are approximately of equal area within a reduced rear shell portion. This means that hold-back and reaction forces are non-interfering; i.e., when reaction reaches its peak, hold-back forces may be overcome by increased push rod force without any delay to overcome the reference pressure in the donut diaphragms.

Having shown at least three embodiments for my invention, I do not wish to be limited thereto for as may be readily appreciated by those skilled in the art to which my invention relates, other forms may be provided without departing from the spirit of my idea.

I claim:
1. A servomotor comprising:
   a housing including a front shell and a rear shell;
   a means to join said front and rear shell;
   a rolling diaphragm having a peripheral bead between said shells to seal the juncture of same, said rolling diaphragm extending inwardly of said shells and being provided with an axially thickened inner portion;
   a force transmitting means centrally of said housing and reciprocatorily mounted through said front shell to project inwardly of said housing, said force transmitting means including an adjustable extension on one end and a drilled opening in the other end with a bearing seal operatively connecting the housing and the force transmitting means;
   a means including a first annular plate and front and rear snap rings to sealingly join said force transmitting means to said rolling diaphragm adjacent said drilled opening;
   a rod having an axial bore in one end thereof reciprocatorily mounted in the drilled opening of said force transmitting means, which rod extends inwardly or rearwardly of said rolling diaphragm towards an inner surface of said rear shell;
   a second annular plate operatively connected to said rod adjacent its innermost end;
   a hollow, flexible movable wall in said housing behind said rolling diaphragm in said rear shell, said hollow, flexible movable wall being affixed to said housing, said hollow movable wall having a conduit leading to a referenced pressure source to expand said hollow movable wall with a first pressure medium;
   a means to operatively connect said second annular plate and said hollow, flexible movable wall, which means includes a valve housing, a valve mechanism and a reaction mechanism, said valve housing being provided with appropriate passages arranged to be controlled by said valve mechanism to control transition between a suspension pressure source of a second pressure medium and said first pressure source to create a pressure differential across said rolling diaphragm such that the rolling diaphragm is moved forwardly;
   a push rod reciprocatorily mounted through said rear shell forwardly to operate said valve mechanism, said push rod arranged to be movable relative to said valve housing and operatively connected to said reaction means; and
   means to size the effective area of said hollow, flexible movable wall in accordance with the force produced by said reaction means to limit travel of said push rod to that required to operate said valve mechanism until such time as said first pressure medium is suspending said hollow, flexible movable wall whereupon said push rod may manually follow-through to operate said force transmitting means.

2. A servomotor comprising:
   a housing including a front shell and a rear shell;
   a means to join said front and rear shell;
   a first movable wall internally of said housing;
   a force transmitting means operatively connected to said first movable wall and arranged to project from said housing;
   a hollow second movable wall in said housing including a connecting means for operatively connecting said first movable wall and said second movable wall;
   a valve mechanism operatively connected to said hollow second movable wall to control the servomotor including, a push rod projecting internally of said housing and a reaction mechanism to impart reactive forces of said first movable wall upon said push rod; means to provide a first fluid pressure source internally of said hollow second movable wall; and means to provide a second fluid pressure source on one side of said first movable wall; and conduit means for supplying said second pressure source to said valve mechanism to normally suspend said first movable wall and the exterior portions of said second movable wall in said second pressure source.

3. In a servomotor according to claim 2 and further comprising a means to size the effective area of said second hollow movable wall to the reactive force of said reaction mechanism in order to limit travel of said push rod to that required to operate said valve mechanism until such time as said first pressure medium is suspending said hollow, flexible movable wall whereupon said push rod may manually follow-through to operate said force transmitting means.

4. A servomotor according to claim 2 and further comprising a spring means operatively connecting said first movable wall to said housing to bias said first movable wall rearwardly in said housing to thereby return said first movable wall to its normal nonoperative position in said housing after actuation of said servomotor.

5. A servomotor comprising:
a housing including a front shell and a rear shell;
a means to join said front and rear shells;
a rolling diaphragm having a peripheral bead between said shells to seal the juncture of same, said rolling diaphragm extending inwardly of said shells and being provided with an axially thickened inner portion;
a force transmitting means centrally of said housing and reciprocatorily mounted through said front shell to project inwardly of said housing, said force transmitting means including an adjustable extension on one end and a drilled opening in the other end with means operatively connecting the housing and said force transmitting means;
a means joining said force transmitting means to said rolling diaphragm adjacent said drilled opening therein;
a rod having an axial bore in one end thereof reciprocatorily mounted in the drilled opening of said force transmitting means, which rod extends inwardly or rearwardly of said rolling diaphragm towards an inner surface of said rear shell;
a valve housing means operatively connected to said rod adjacent its inwardmost end and arranged to permit reciprocatory movement inwardly in said housing, said valve housing having means to permit the reciprocatory movement without destroying the structural integrity of the housing;
a hollow, flexible movable wall in said housing behind said rolling diaphragm, said hollow, flexible movable wall being affixed to said housing and operatively connected to said valve housing, said hollow, flexible movable wall having a conduit leading to a reference pressure source to expand said hollow movable wall with a first pressure medium;
a reaction mechanism operatively connected to said valve housing;
a valve mechanism operatively arranged in said valve housing and including a push rod operatively connected to said reaction mechanism; and
means to size the effective area of said hollow, flexible movable wall in accordance with the force produced by said reaction mechanism to limit travel of said push rod to that required to operate said valve mechanism until such time as said first pressure medium is suspending said hollow, flexible movable wall whereupon said push rod may manually follow-through to operate said force transmitting means.

6. A servomotor comprising:
a housing including a front shell and a rear shell with said front shell having a large diameter opening and rear shell having a smaller diameter opening;
a means to join said front and rear shells;
a rolling diaphragm having a peripheral bead between said shells to seal the juncture of same, said rolling diaphragm extending inwardly of said shells and being provided with an axially thickened inner portion;
a force transmitting means centrally of said housing and reciprocatorily mounted through said front shell to project inwardly of said housing, said force transmitting means including an adjustable extension on one end and a drilled opening in the other end with a bearing seal operatively connecting the housing and the force transmitting means;
a means including a first annular plate and front and rear snap rings to sealingly join said force transmitting means to said rolling diaphragm adjacent said drilled opening;
a spring biased between said housing and said annular plate to position said diaphragm spaced inwardly from an inner surface of said front shell;
a rod having an axial bore in one end thereof reciprocatorily mounted in the drilled opening of said force transmitting means, which rod extends inwardly or rearwardly of said rolling diaphragm towards an inner surface of said rear shell;
a second annular plate operatively connected to said rod adjacent its inwardmost end and arranged to permit relative movement between said rod and said force transmitting means such that said rod can be moved by said plate or irrespective of said force transmitting means;
a hollow, flexible movable wall in said housing behind said rolling diaphragm in said rear shell, said hollow, flexible movable wall being affixed to said rear shell, said hollow, movable wall having a conduit leading to a referenced pressure source to expand said hollow, flexible movable wall with a first pressure medium;
a means to operatively connect said second annular plate and said hollow, flexible movable wall which means includes a valve housing, a valve mechanism and a reaction mechanism, said value housing being provided with appropriate passages arranged to be controlled by said valve mechanism to control transition between a suspension pressure source of a second pressure medium and said first pressure source to create a pressure differential across said rolling diaphragm such that the rolling diaphragm is moved forwardly in opposition to said spring means;
a push rod reciprocatorily mounted through said rear shell forwardly to operate said valve mechanism, said push rod arranged to be movable relative to said valve housing and operatively connected to said reaction means; and
means to communicate said first pressure medium to said valve mechanism to control translation of said rolling diaphragm in said front shell such that said hollow, flexible movable wall limits travel of said push rod to that required to operate said valve mechanism until such time as said first pressure medium is suspending said hollow, flexible movable wall internally and externally thereof whereupon said push rod may manually follow-through to engage said plate and said force transmitting means to operate said force transmitting means.

7. A servomotor comprising:
a housing including a front shell and a rear shell with said front shell having a large diameter opening and said rear shell having a smaller diameter opening;

a means to join said front and rear shell;

a first movable wall operatively arranged in said front shell of said housing;

a force transmitting means operatively connected to said first movable wall and reciprocatorily mounted through said front shell by a bearing seal to project from said housing, said force transmitting means including an adjustable extension on one end and a drilled opening in the other end;

a spring biased between said housing and said first movable wall to position said first movable wall inwardly from an inner surface of said front shell;

a rod having an axial bore in one end thereof reciprocatorily mounted in the drilled opening of said force transmitting means, which rod extends inwardly or rearwardly of said first movable wall towards an inner surface of said rear shell;

an annular plate operatively connected to said rod adjacent its inwardmost end and arranged to permit relative movement between said rod and said force transmitting means such that said rod can move inwardly irrespective of said force transmitting means;

a second hollow, flexible movable wall in said housing behind said rolling diaphragm in said rear shell, said second movable wall being affixed to said rear shell, said second movable wall having a conduit leading to a reference pressure source to expand said hollow movable wall with a first pressure medium;

a means to operatively connect said annular plate and said second movable wall which means includes a valve housing, a valve mechanism and a reaction mechanism, said valve housing being provided with appropriate passages arranged to be controlled by said valve mechanism to control transition between a suspension pressure source of a second pressure medium and said first pressure source to create a pressure differential across said first movable wall such that said first movable wall is moved forwardly in opposition to said spring means;

a push rod reciprocatorily mounted through said rear shell and supported in same by a bearing seal to project forwardly to operate said valve mechanism, said push rod arranged to be movable relative to said valve housing and operatively connected to said reaction means; and means to communicate said first fluid pressure medium to said valve mechanism to provide a control pressure on one side of said first movable wall and about said second movable wall such that said first pressure medium internally of said second movable wall limits travel of said push rod to that required to operate said valve mechanism until such time as said first pressure medium is suspending said second movable wall whereupon said push rod may manually follow-through to operate said force transmitting means.

8. A fluid pressure motor comprising:
a housing;
a first pressure responsive motor in said housing;
a valve means for controlling said first pressure responsive motor;
a second pressure responsive motor in said housing including a hollow movable wall;
and means in said housing to introduce a reference pressure internally of said hollow movable wall to hold said valve means motionless until a control pressure scheduled by said valve means to operate said first pressure responsive motor approaches said reference pressure whereupon said valve means is allowed to followup said first pressure responsive motor to provide an operator thereof with a warning of excessive travel by said first fluid pressure motor.

9. A fluid pressure motor according to claim 8 and further comprising a reaction means including a pressure responsive member whose effective area is sized with regard to equating it to an effective area of said second pressure responsive motor in said housing.

10. A fluid pressure motor according to claim 9 and further comprising a means to bias said first pressure responsive motor to a normally nonactuated position.

11. A fluid pressure motor according to claim 10 and further comprising a means to delay the operation of said reaction means during the initial operation of said valve means.

12. A servomotor comprising:
a first movable wall;
a hollow second movable wall;
a means to supply a first pressure source to said servomotor to normally suspend said first and second movable walls in the first pressure source;
a means to supply a second pressure source to one side of said movable wall and to suspend said second movable wall while holding said first pressure source on the other side of said second movable wall;
a means to supply reference pressure internally of said hollow second movable wall at all times; and
a means to control the transition from said first pressure source suspension of said first movable wall to the creation of a pressure differential across said first movable wall insofar as said first pressure source and said second pressure source are different to variably position said first movable wall, said means to control transition being arranged for remote actuation.

References Cited
UNITED STATES PATENTS

| | | | |
|---|---|---|---|
| 2,713,850 | 7/1955 | Bradbury et al. | 92—100 |
| 3,075,499 | 1/1963 | Prathen | 91—391 |
| 3,076,441 | 2/1963 | Nyer | 91—391 |
| 3,126,794 | 3/1964 | Nyer | 91—434 |
| 3,151,532 | 10/1964 | Nyer | 91—434 |
| 3,155,012 | 11/1964 | Nyer | 91—391 |

MARTIN P. SCHWADRON, *Primary Examiner.*

PAUL E. MASLOUSKY, *Examiner.*